United States Patent

[11] 3,582,059

| [72] | Inventor | Christiaan Mihai Van Ooy<br>Rotterdam, Netherlands |
| --- | --- | --- |
| [21] | Appl. No. | 834,577 |
| [22] | Filed | May 14, 1969 |
| [45] | Patented | June 1, 1971 |
| [73] | Assignees | Arie Adrianus de Konig<br>Paradijsweg, Oud-Beijerland, Netherlands;<br>Kornelis Korstiaan Karel de Konig<br>Kwaksiweg, Oud-Beijerland, Netherlands,<br>part interest to each |
| [32] | Priority | May 14, 1968 |
| [33] | | Netherlands |
| [31] | | 68/06,812 |

[54] TELESCOPIC SHOCK ABSORBER
3 Claims, 1 Drawing Fig.

[52] U.S. Cl. ..................................................... 267/34,
 267/1(80)
[51] Int. Cl. ........................................................ B60g 11/56

[50] Field of Search ........................................... 267/34, 1
 (80)

[56] References Cited
UNITED STATES PATENTS

| 3,347,541 | 10/1967 | Buccino ...................... | 267/34 |
| --- | --- | --- | --- |

FOREIGN PATENTS

| 45,694 | 4/1930 | Denmark ..................... | 267/1(80) |
| --- | --- | --- | --- |

Primary Examiner—James B. Marbert
Attorney—Diller, Brown, Ramik and Holt

ABSTRACT: A shock absorber comprising two telescoping sections each including a spring washer for supporting the ends of a helical compression spring made of wire coaxially wound about the shock absorber and freely movable relative to it, wherein the wire of the compression spring is provided with at least one roller-shaped guide member coaxial with the wire and rotatable about it.

PATENTED JUN 1 1971
3,582,059
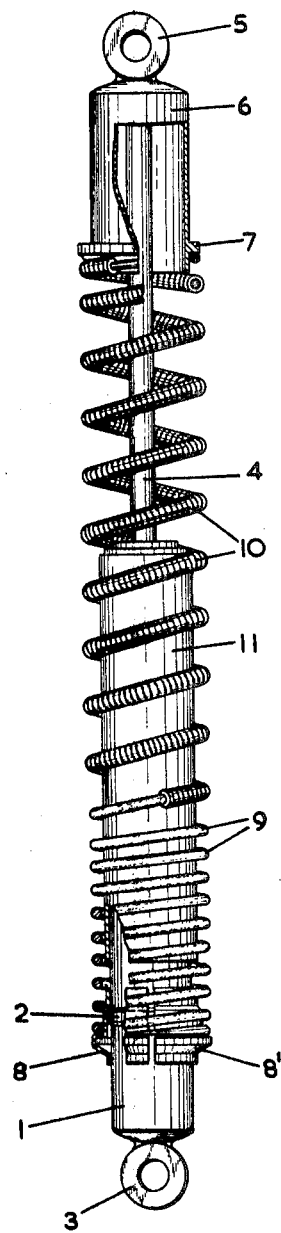
INVENTOR
CHRISTIAAN MIHAI VAN OOY
BY
Diller, Brown, Ramik + Hult
ATTORNEYS

TELESCOPIC SHOCK ABSORBER

This invention relates to a shock absorber comprising two telescoping sections each including a spring washer for supporting the ends of a helical compression spring coaxially wound about the shock absorber and freely movable relative to it, hereinafter referred to as a shock absorber of the kind described.

Such a shock absorber is used particularly for vehicles, in which the compression spring around the shock absorber serves as an auxiliary spring to increase the carrying power in the vehicle spring.

In order to make the device as compact as possible, the spring is arranged as closely to the shock absorber as possible. Since the total compression of the spring must at least be equal to the length of stroke of the shock absorber, the total length of the spring will be so great that the spring is deflected laterally upon compression.

To prevent damage to the shock absorber, a sheath has hitherto been applied around it, which, to minimize noise, was made of rubber or like sound deadening material.

Such a sheath has a short service life, as a result of the heavy wear conditions to which it is subjected.

It is an object of the present invention to provide a construction which entirely eliminates the wear and noise occuring during operation of the shock absorber.

According to the invention, there is provided a shock absorber of the kind described, wherein the wire of the compression spring is provided with one or more roller-shaped guide members coaxial with the wire and rotatable about it.

One embodiment of the invention will be described, by way of example, with reference to the accompanying drawing, which illustrates a part-sectional elevation of a shock absorber according to the invention.

Referring to the drawing, 1 is the casing of a telescoping shock absorber, which is provided with an annular land 2 and an attachment eye 3.

A rod 4 is axially movable in the housing 1 and on the end away from the housing provided with an attachment eye 5 and a sleeve 6 having an annular collar 7. Arranged around the annular land 2 of the housing 1 is a two-part ring 8, 8', which like the annular collar 7 serves as a spring washer for a helically wound cylindrical compression spring 9.

To obtain a certain spring characteristic, the portion of the spring bearing on the shock absorber housing 1 has a smaller angle of pitch than the portion bearing on the sleeve 6.

A second, likewise helically wound spring 10 has been shifted on to the latter portion of the spring, having small windings of an inner diameter substantially equal to the thickness of the wire of the spring 9, and large windings cooperating with those of the spring 9. During the operating of the shock absorber, the compression spring 9 will be laterally deflected until one or more windings come into contact with the shock absorber housing 1. For protection of the housing 1, a sheath 11 of sound-deadening material is applied around it.

During the telescoping movements of the shock absorber, the windings of the second spring 10 applied around the windings of the compression spring 9 act as roller guides, there being a rolling movement of the spring 10 coaxially around the windings of the spring 9 when the spring 10 rolls on the sheath 11.

To prevent the second spring 10 from moving helically along the windings of the spring 9, one of the ends of the second spring 10 is clamped between two end windings of the spring 9.

The compression spring 9 has thus acquired a rolling guide, which substantially eliminates wear and noise owing to sliding friction in the known shock absorber.

I claim:

1. A shock absorber comprising two telescoping sections each including a spring washer for supporting the ends of a helical compression spring made of wire coaxially wound about the shock absorber closely surrounding at least one of said telescoping sections. and freely movable relative to it, wherein the wire of the compression spring is provided with roller guide means coaxial with the wire and rotatable about it for protecting said one telescoping section against wear and noise through contact with said compression spring.

2. A shock absorber according to claim 1, wherein said guide means is a cylindrical helically wound spring having a small internal diameter substantially equal to the thickness of the wire of said helical compression spring.

3. A shock absorber according to claim 2, wherein one end of the spring constituting the guide means is clamped between two end windings of said helical compression spring.